(12) United States Patent
Porthault et al.

(10) Patent No.: US 9,972,827 B2
(45) Date of Patent: May 15, 2018

(54) METHOD FOR PRODUCING 3D-STRUCTURED THIN FILMS

(71) Applicants: COMMISSARIAT Á L' ÉNERGIE ATOMIQUE ET AUX ÉNERGIES ALTERNATIVES, Paris (FR); CENTRE NATIONAL DE LA RECHERCHE SCIENTIFIQUE, Paris (FR)

(72) Inventors: Hélène Porthault, Echirolles (FR); Frédéric Le Cras, Villenave d'Ornon (FR); Sylvain Franger, Gif sur Yvette (FR)

(73) Assignees: COMMISSARIAT À L'ENERGIE ATOMIQUE ET AUX ENERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 116 days.

(21) Appl. No.: 14/770,238

(22) PCT Filed: Feb. 24, 2014

(86) PCT No.: PCT/FR2014/000044
§ 371 (c)(1),
(2) Date: Aug. 25, 2015

(87) PCT Pub. No.: WO2014/128371
PCT Pub. Date: Aug. 28, 2014

(65) Prior Publication Data
US 2016/0006016 A1  Jan. 7, 2016

(30) Foreign Application Priority Data

Feb. 25, 2013 (FR) .................................. 13 00426

(51) Int. Cl.
*H01M 4/04* (2006.01)
*H01M 10/052* (2010.01)
(Continued)

(52) U.S. Cl.
CPC .............. *H01M 4/045* (2013.01); *C25D 9/08* (2013.01); *H01M 4/139* (2013.01);
(Continued)

(58) Field of Classification Search
CPC . H01M 4/0469; H01M 4/139–4/13915; C25D 9/08
See application file for complete search history.

(56) References Cited

U.S. PATENT DOCUMENTS 7,045,372 B2 * 5/2006 Ballantine ............. H01L 23/522
257/E23.142
2005/0266304 A1 * 12/2005 Honda ..................... C25D 1/04
429/128
(Continued)

FOREIGN PATENT DOCUMENTS

DE     102011002083 A1   10/2012
WO     2011/110685 A1    9/2011
WO     WO 2012098941 A1 * 7/2012  ............ B22F 3/1137

OTHER PUBLICATIONS

H. Porthault, F. Le Cras, R. Baddour-Hadjean, J.P. Pereira-Ramos, S. Franger, One step synthesis of lamellar R-3m LiCoO2 thin films by an electrochemical-hydrothermal method, Electrochimica Acta, vol. 56, Issue 22, Sep. 1, 2011, pp. 7580-7585, ISSN 0013-4686, http://doi.org/10.1016/j.electacta.2011.06.083.*
(Continued)

*Primary Examiner* — Louis J Rufo
(74) *Attorney, Agent, or Firm* — Oliff PLC

(57) ABSTRACT

The method for producing a stack of films provided with at least one 3D-structured pattern including providing a first
(Continued)

mold having a textured front face including a first 3D pattern, depositing a first layer of the stack on the textured front face so as to cover the first 3D pattern by a continuous layer, the first layer having a first face in contact with the front face of the mold, removing the first mold so as to release the first face of the first layer having a second 3D pattern complementary to the first 3D pattern and depositing a second layer of the stack on the first face of the first layer so as to cover the second 3D pattern by a continuous layer.

18 Claims, 5 Drawing Sheets

(51) Int. Cl.
    H01M 4/139     (2010.01)
    H01M 10/058    (2010.01)
    C25D 9/08      (2006.01)
    H01M 4/02      (2006.01)
(52) U.S. Cl.
    CPC ....... *H01M 10/052* (2013.01); *H01M 10/058* (2013.01); *H01M 2004/025* (2013.01); *H01M 2220/30* (2013.01)

(56) References Cited

U.S. PATENT DOCUMENTS

| | | | |
|---|---|---|---|
| 2006/0121345 A1* | 6/2006 | Yasuda | C25D 1/04 429/209 |
| 2006/0134501 A1 | 6/2006 | Lee et al. | |
| 2008/0063866 A1* | 3/2008 | Allen | A61B 5/685 428/389 |
| 2013/0022834 A1 | 1/2013 | Prevond et al. | |
| 2013/0048154 A1 | 2/2013 | Prevond et al. | |
| 2013/0061987 A1 | 3/2013 | Prevond et al. | |
| 2013/0295459 A1* | 11/2013 | Nishimura | B22F 3/1137 429/211 |

OTHER PUBLICATIONS

Zhen Quan, Kosuke Iwase, Noriyuki Sonoyama, Synthesis and electrochemical property of LiCoO2 thin films composed of nanosize compounds synthesized via nanosheet restacking method, Journal of Power Sources, vol. 196, Issue 16, Aug. 15, 2011, pp. 6762-6767, ISSN 0378-7753, http://doi.org/10.1016/j.jpowsour.2010.10.076.*

Sep. 16, 2014 International Search Report issued in International Patent Application No. PCT/FR2014/000044.

Sep. 16, 2014 Written Opinion issued in International Patent Application No. PCT/FR2014/000044.

Baggetto, et al; "On the electrochemistry of an anode stack for all-solid-state 3D-integrated batteries;" Journal of Power Sources; 2009; vol. 189; pp. 402-410.

Baggetto et al; "3D negative electrode stacks for integrated all-solid-state lithium-ion microbatteries;" Journal of Materials Chemistry; 2010; vol. 20; pp. 3703-3708.

* cited by examiner

METHOD FOR PRODUCING 3D-STRUCTURED THIN FILMS

BACKGROUND OF THE INVENTION

The invention relates to a method for producing a stack of thin layers comprising at least one structured three-dimensional pattern.

STATE OF THE ART

Over the past few decades, the field of micro and nano-technologies has been the stage for unceasing progress, which has over the years turned into a frenzied race to achieve performance and miniaturisation. Improving the fabrication methods of layers or stacks of patterned thin layers, having geometrical shapes in three dimensions, has not escaped the effects of this unceasing progress. Indeed, this type of stack of thin layers offers a wide range of interesting applications, in particular to achieve nanometric or micrometric structures designed to form microelectronic, optical, or biotechnological devices.

For example purposes, electrochemical microbatteries can be fabricated by successive depositions in thin layers of a positive electrode material, an electrolyte, and a negative electrode material. This electrochemically active stack can have a total thickness of a few tens of micrometers. An increase of the performances of this type of microbatteries has proved to be able to be obtained by an electrode configuration that is no longer of planar geometry (2D or in two dimensions), but of three-dimensional geometry (3D).

The article [On the electrochemistry of an anode stack for all-solid-state 3D-integrated batteries, L. Baggetto et al., Journal of Power Sources, 189(1) 402-410, (2009)] describes fabrication of a substrate comprising trenches or pores that are not pass-through, enabling surface gains with a form factor of about 25 to 28 to be achieved. The substrate provided with trenches serves the purpose of forming a stack of thin layers for fabricating electrochemical microbatteries. The silicon substrate is first of all etched to create the trenches and increase the developed surface. The etching step is followed by deposition of a lithium diffusion barrier layer by ALD (Atomic Layer Deposition), and then a layer of silicon of about 50 nm constituting the negative electrode is formed by LPCVD (Low Pressure Chemical Vapour Deposition). An electrochemical half-cell: substrate/barrier layer/anode of 3D geometry has thus been able to be fabricated.

This type of stack of thin layers enables the electrochemical performances to be improved. Indeed, the article [3D negative electrode stacks for integrated all-solid-state lithium-ion microbatteries, L. Baggetto et al., Journal of Materials Chemistry, 20(18) 3703-3708, (2010)] describes testing of this type of half-cell in a liquid electrolyte. The electrochemical results of the tests performed showed that this 3D configuration enables the storage capacity to be multiplied by five in comparison with a planar configuration. However, this type of stack of thin layers on the substrate suffers from a lack of conformity of the thickness of the deposited layers. Furthermore, this type of architecture makes it difficult to perform deposition of a solid electrolyte layer to produce operational electrochemical microbatteries.

OBJECT OF THE INVENTION

A requirement exists to provide a method for fabricating a stack of layers comprising at least one 3D structured pattern that is easy to implement, efficient and enables conformal depositions to be obtained over the whole of the texturing.

This requirement tends to be met by providing a method for fabricating a stack of layers comprising at least one 3D structured pattern, the method comprising the following steps:
  providing a first mould provided with a textured front surface comprising a first 3D pattern;
  depositing a first layer of the stack on the textured front surface so as to cover the first 3D pattern by means of a continuous layer, the first layer having a first surface in contact with the front surface of the mould;
  removing the first mould so as to release the first surface of the first layer presenting a second 3D pattern complementary to the first 3D pattern;
  depositing a second layer of the stack on the first surface of the first layer so as to cover the second 3D pattern by means of a continuous layer.

Advantageously, the 3D pattern is formed by a blind hole opening onto the front surface of the first mould.

Advantageous deposition of a third layer on the second layer is also performed, the third layer forming an electrolyte layer, and the stack of first, second and third layers forming a stack of electrochemically active layers of an electrochemical microbattery.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PREFERRED EMBODIMENTS

Figure 1:
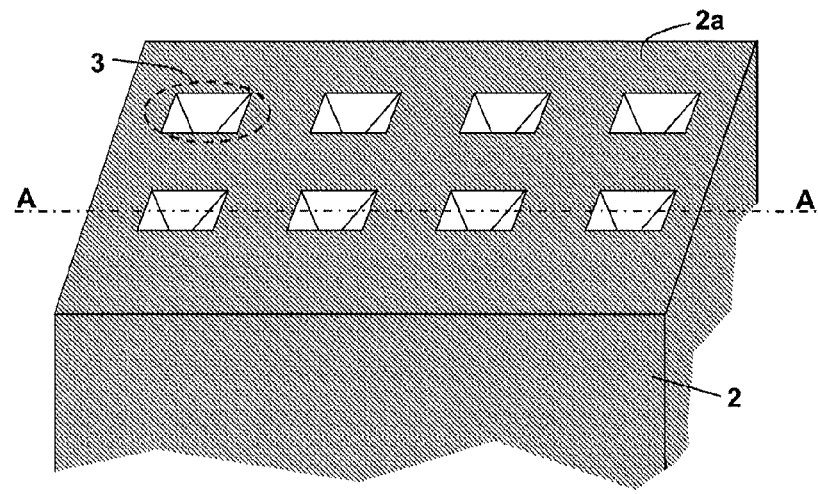
FIG. 1 schematically illustrates a perspective view of a mould used in the method according to a particular embodiment.
Figure 2:
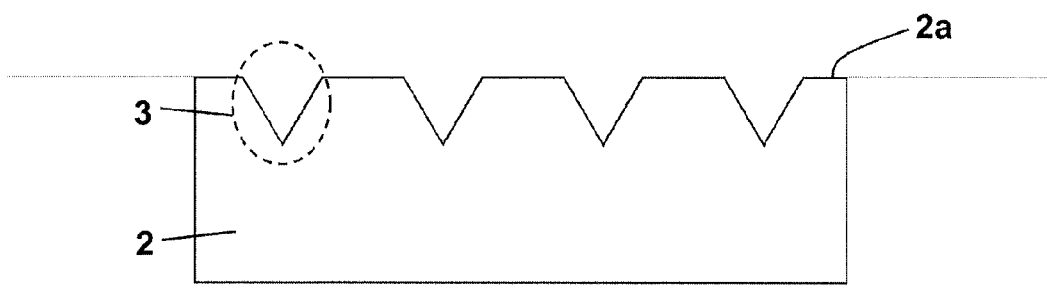
FIG. 2 schematically illustrates a cross-sectional view along the line AA of the mould of FIG. 1.

According to a particular embodiment of a fabrication method of a stack of layers provided with a 3D structured pattern, a first step of the method consists in providing a first mould. As illustrated in FIGS. 1 and 2, first mould 2 is provided with a textured front surface 2a, comprising a first 3D pattern 3 and possibly a substantially flat part. What is meant by 3D pattern is any three-dimensional geometrical shape made on front surface 2a of first mould 2. The three-dimensional geometrical shape can be either in the form of a cavity opening onto the flat part of front surface 2a, or be raised salient on the flat part of front surface 2a. In other words, front surface 2a comprising the first 3D pattern is either a concave surface or a convex surface. For example purposes and as illustrated in FIG. 1, the first 3D pattern is a cavity having the shape of an inverted square pyramid the base of which is located on front surface 2a of first mould 2. The rear surface of mould 2 can be flat or textured.

Preferentially, front surface 2a of first mould 2 is electrically conducting. First mould 2 can be a metal sheet or an insulating substrate covered by an electrically conducting layer. Advantageously, first mould 2 is a silicon substrate covered by a metallic layer formed by platinum or another noble metal. First mould 2 comprising the first 3D pattern can be achieved by a conventional technique used in the microelectronics field. For example, if a silicon substrate is used, the first 3D pattern can be made by means of anisotropic etching, for example RIE (RIE standing for Reactive Ion Etching), or any other volume micromachining technique. Preferentially, front surface 2a of first mould 2 is smooth and presents as little roughness as possible.

Figure 3A:
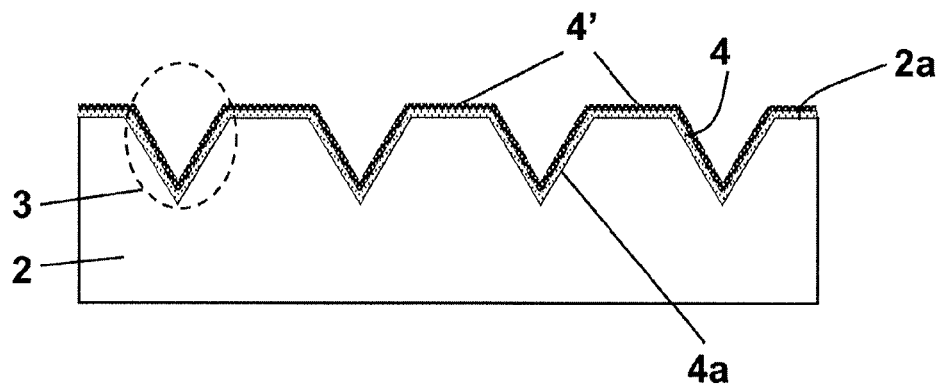
FIGS. 3 to 7 schematically illustrate, in cross-section, different fabrication steps of the method according to different embodiments.

As illustrated in FIG. 3A, the method also comprises a deposition step of a first layer 4 of the stack on the textured front surface 2a of first mould 2 so as to cover the first 3D pattern 3 by means of a continuous layer. In other words, first layer 4 completely, and advantageously in conformal manner, covers pattern 3 without leaving any surface of the 3D pattern 3 uncovered. Furthermore, first layer 4 is deposited so as overlap first pattern 3. Preferentially, first layer 4 has a thickness comprised between 10 nm and 40 μm. First layer 4 produced in this way comprises a first front surface 4a in contact with front surface 2a of first mould 2. In advantageous manner, deposition of layer 4 is a conformal deposition enabling conformal thicknesses of first layer 4 to be had in pattern 3 and on the flat part of first mould 2. Conformal deposition of first layer 4 enables a substantially constant thickness to be obtained at any point of said layer. First layer 4 therefore snugly follows the shape of first mould 2 so that first surface 4a has an identical geometrical shape to that of front surface 2a, and keeps an identical pattern to the 3D pattern present on the mould.

At least one additional first layer 4' is advantageously deposited on first layer 4. In like manner, first additional layer 4' is advantageously a continuous and/or conformal layer. The surface of first additional layer 4' thus keeps substantially the same pattern as first mould 2. Deposition of first layer 4 and of additional layer 4' can be performed by conventional thin layer deposition technique, for example by PVD (PVD standing for Physical Vapor Deposition), or CVD (CVD standing for Chemical Vapor Deposition), or LPCVD, or ALD.

Figure 3B:
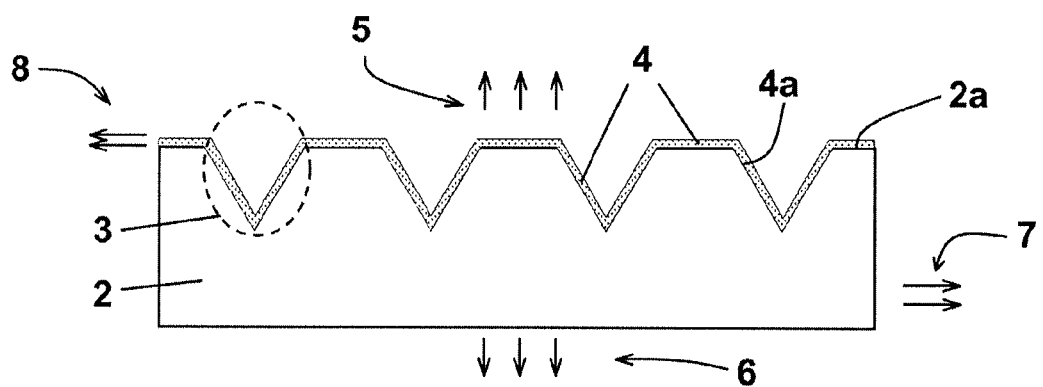
Figure 3C:
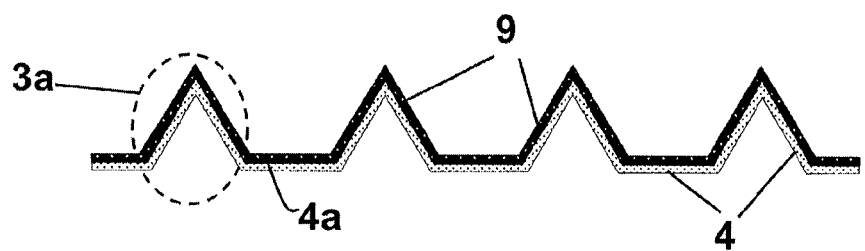

As illustrated in FIGS. 3B and 3C, after the deposition step of at least first layer 4, first mould 2 is removed so as to release first surface 4a of first layer 4 thereby presenting a second 3D pattern 3a complementary to first 3D pattern 3. The step of removal of the first mould 2, or demolding, reveals surface 4a of first layer 4, which was in contact with front surface 2a of first mould 2. The surface state of the revealed front surface 4a therefore advantageously has a substantially identical surface state to the surface state of front surface 2a of first mould 2. Demolding can be performed by any known means such as a conventional thin layer transfer technique by applying a tear-off force 5 and 6 and/or a shear force 7 and 8 and/or a torsion force (not represented). Selective etching able to eliminate first mould 2 can also perform the step of removal of the first mould 2.

A second layer 9 is then deposited on first surface 4a of first layer 4, after the removal of the first mould 2, so as to cover the second 3D pattern 3a by means of a continuous layer. Second layer 9 is thus advantageously deposited on the first front surface 4a, which has substantially the same surface state as the front surface 2a of mould 2. Preferentially, the surface of front surface 2a is devoid of roughness. In other words, it corresponds to a surface having a low roughness, preferably less than 10 nm, and advantageously a RMS roughness of less than 5 nm. Second layer 9 can be deposited by a conventional non-conformal deposition technique, knowing that deposition will be more conformal on a bump than in a cavity.

Advantageously, first pattern 3 of first mould 2 is formed by a blind hole 3 opening onto the front surface 2a of first mould 2. A blind hole 3 opening onto the front surface 2a thus enables a second pattern 3a salient from the first front surface 4a to be formed in first layer 4. Furthermore, the deposited layers, using conventional deposition techniques such as PVD deposition or deposition of spin-coating type, are of better quality on salient 3D patterns than on 3D patterns in the form of cavities. The conventional depositions performed on salient 3D patterns generally enable more conformal layers to be achieved, in terms of thickness and continuity, in comparison with the depositions performed in cavities. Second layer 9 deposited on first layer 4 is therefore advantageously conformal and itself comprises a salient 3D pattern. Deposition of one or more layers on second layer 9 can therefore also be performed with conventional deposition techniques to form a stack of conformal layers.

Figure 4:
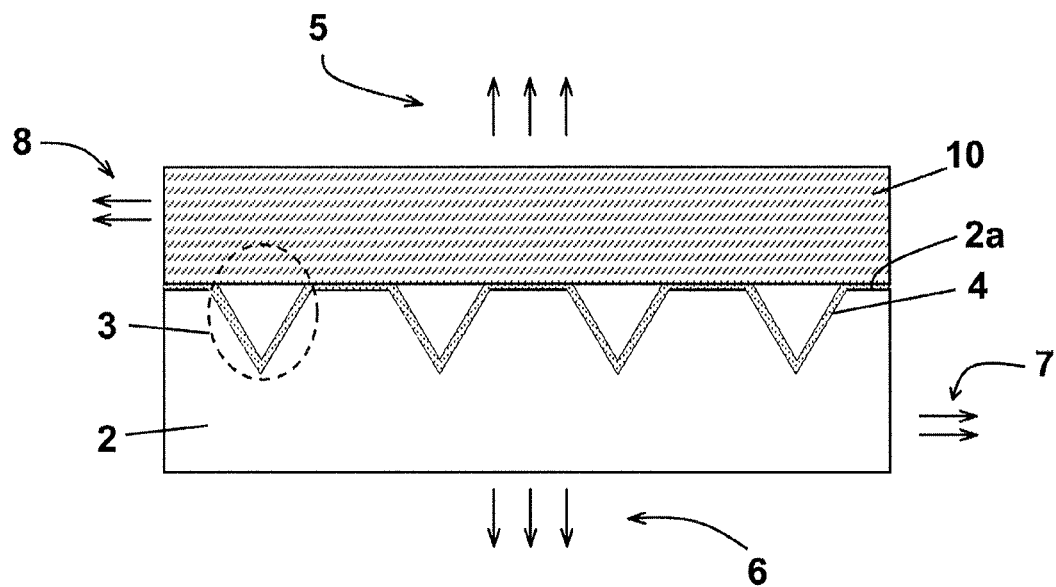

According to a particular embodiment illustrated in FIG. 4, a support substrate 10 is arranged on first layer 4, before the removal step of the first mould 2. Support substrate 10 is arranged in such a way that first layer 4 is interposed between support substrate 10 and first mould 2. In the case of deposition, before demolding, of one or more additional layers on first layer 4, support substrate 10 is then arranged on the last additional layer deposited on first layer 4. Support substrate 10 provides a mechanical support for the first layer (or for the stack comprising first layer 4 and the additional layers) after the removal of the first mould 2. Support substrate 10 is a substrate having a substantially larger thickness than the sum of the thicknesses of first layer 4 and of additional layers 4'. Preferentially, the thickness of substrate 10 is 5 times greater, and advantageously more than 10 times greater, than the sum of the thicknesses of layers (4 and 4') interposed between first mould 2 and support substrate 10.

Figure 5:
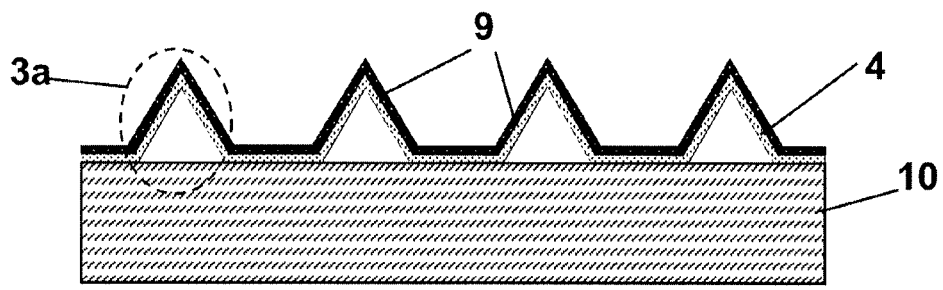

Advantageously, support substrate 10 is an adhesive substrate. What is meant by adhesive substrate is a substrate at least one of the two main surfaces of which presents adhesive properties so as to be transferred onto the stack comprising first mould 2 and first layer 4. Support substrate 10 can thus be bonded onto first layer 4, and can advantageously participate in the detachment step of the first layer 4 from the first mould 2. The different depositions of thin layers (first layer 4 and additional layer or layers 4' if this is the case) can in fact be performed in such a way that the bonding energy between each two successive layers is greater than a first bonding energy E1 between first layer 4 and first mould 2. In similar manner, adhesive support substrate 10 can be bonded with a higher bonding energy Ec than the first bonding energy E1. Tractive forces (5, 6) and/or shear forces (7, 8) can then be applied on first mould 2 and support substrate 10 to perform detachment of first layer 4 from first mould 2. As illustrated in FIGS. 4 and 5, forces 5, 6, 7 and 8 can thus perform transfer of first layer 4 from mould 2 to support substrate 10. Therefore, after demolding, second layer 9 can be deposited on first surface 4a comprising the second pattern 3a complementary to the first pattern 3.

Support substrate 10 can also be removed from the stack comprising first layer 4 after the removal of first mould 2. The removal of support substrate 10 can be performed by chemically etching the adhesive bond between support substrate 10 and the stack, or by dissolving support substrate 10 in a chemical bath, or by using any other known technique. A self-supported stack comprising first thin layer 4 and second thin layer 9 can thus be achieved without having recourse to any mechanical support substrate. This particular embodiment can achieve a stack of layers having a reduced thickness, thereby facilitating miniaturisation of the devices comprising such a stack.

In the field of optics and photonics, micro-patterning on smaller scales than the optic wavelength, in particular at wavelengths ranging from the visible to the near-infrared, enables efficient processing of the optic signal. It is in fact henceforth possible to trap the light at the surface or in a volume of a support and to make it interact with other physical quantities under entirely new conditions. For example purposes, second layer 9 can be made from silica and first pattern 3 can be shaped so as to achieve structures and shapes as diverse as micropyramids and networks of lines, presenting conformal lateral and depthwise dimensions of about a few hundred, or even a few tens of nanometers. Such micro-patterned thin layers can be used for fabricating devices in the field of photovoltaic cells, or in the field of optoelectronics and optic imaging, for example microlenses, waveguides, etc.

The method for fabricating the stack of thin layers described above is a method that is easy to implement, advantageously forming a stack of conformal and roughness-free, thin layers with a 3D architecture. This type of method can thus be advantageously implemented to easily fabricate high-performance optoelectronic or optic devices on a large scale.

Figure 6:
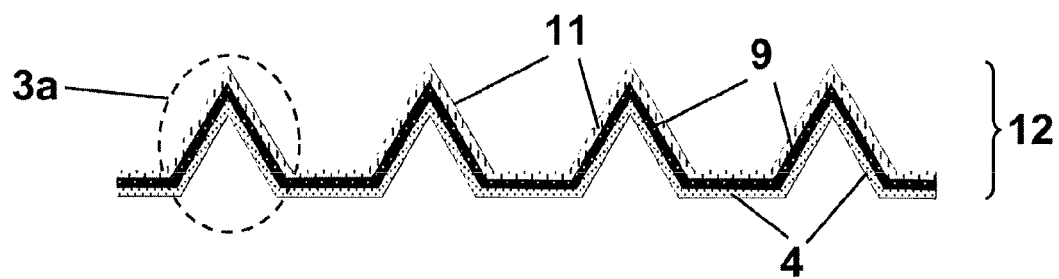
Figure 7:
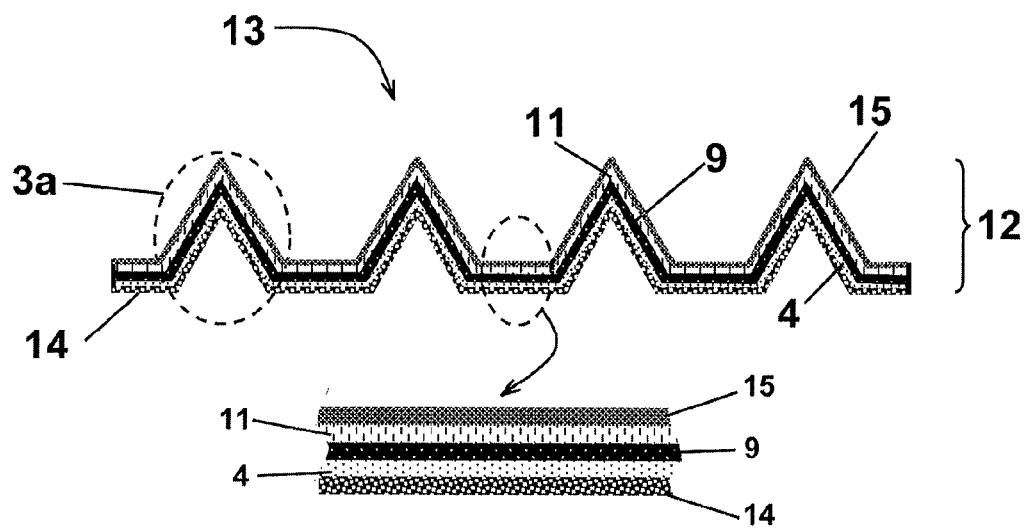

According to a particular embodiment illustrated in FIGS. 6 and 7, a third layer 11 is deposited on second layer 9. In other words, second layer 9 is interposed between first layer 4 and third layer 11. According to this advantageous embodiment, second layer 9 forms a solid electrolyte layer so that the stack of first, second and third layers 4, 9 and 11 forms a stack of electrochemically active layers 12 of an electric microbattery 13. Preferentially, electric microbattery 13 is a lithium (Li) battery. The solid electrolyte is an electrically insulating material having a high ionic conductivity. The solid electrolyte can for example be made from lithium and phosphorus oxynitride (LiPON), a material from the Thio-LiSICON family ($Li_{4-x}Ge_{1-x}P_xS_4$ ($0<x<1$)) or a solid polymer electrolyte (SPE), etc.

Electric microbattery 13 comprises a first electric current collector 14 in contact with first layer 4 and a second electric current collector 15 in contact with third layer 11. First current collector 14 and second current collector 15 are made from electrically conducting material, for example from titanium or tungsten. The layers forming first 14 and second 15 current collectors can be deposited by conventional vacuum deposition techniques such as PVD, evaporation, etc. Preferentially, said layers have sufficient thicknesses to cover the surface roughnesses of first 4 and third 11 layers. Typically, first 14 and second 15 current collectors have thicknesses comprised between 0.5 and 5 µm.

Advantageously, this embodiment also comprises deposition of an electrically conducting additional layer 4' on first layer 4, before the removal step of first mould 2. Said additional layer 4' is configured to form first current collector 14 of electric microbattery 13 (cf. FIGS. 3A and 7). In other words, the additional layer 4' is configured to collect either the cathodic or the anodic current generated in first layer 4 of electric microbattery 13.

Additional layer 4' (or 14) can be deposited by PVD, CVD, LPCVD or ALD before the removal step of first mould 2. For example purposes, layer 4' (or 14) can be made from platinum (Pt), titanium (Ti) or a gold base (Au). Preferentially, layer 4' (or 14) has a thickness ranging from 10 nm to a few micrometers.

In more advantageous manner, support substrate 10 is an electrically conducting substrate and it is configured to form first current collector 14 of electric microbattery 13.

The method for fabricating the microbattery 13 described above is a method that is easy to implement advantageously forming an electrochemically active stack of layers 12 with a 3D architecture. The demolding of first layer 4 enables the solid electrolyte layer (second layer 9) to be deposited on a smooth surface devoid of roughness. This embodiment can thus achieve a stack of conformal thin layers with a 3D architecture, thereby enabling the performances of the electric microbattery to be improved. Indeed, a 3D architecture enables the surface capacity to be increased thereby maximising the energy density of the stack, while at the same time keeping low ionic and electronic transport distances.

According to another particular embodiment, first 4 and third 11 layers can respectively form the anode and cathode of electric microbattery 13. What is meant by anode of an electrochemical microbattery is an electrode configured so as to comprise an electrochemical oxidation reaction designed to emit electrons when the electric microbattery is in active mode, in other words when it is delivering an electric current. Preferentially, the anode of electric microbattery 13 comprises metal lithium, a compound that is capable of reversibly inserting lithium or a compound able to form an alloy with lithium. The anode preferably has a thickness comprised between 10 nm and 22 µm, advantageously between 10 nm and 10 µm.

What is meant by cathode of an electrochemical microbattery is an electrode configured so as to be the seat of an electrochemical reduction reaction designed to insert ions, for example lithium ions, when the microbattery is discharging, in other words when it is supplying an electric current. Preferentially, the cathode of electric microbattery 13 comprises a lithiated oxide of a transition metal, or of a mixture of metals (M), of formula $LiM_xO_y$, or a material chosen from titanium oxysulphide (TiOS), vanadium pentoxide ($V_2O_5$) and titanium disulphide ($TiS_2$). Preferably, the cathode has a thickness comprised between 500 nm and 10 µm, advantageously between 1 µm and 5 µm. In general manner, the thicknesses of the different layers forming the electric microbattery 13 can vary from a few nanometers to several micrometers, the total thickness of the stack not exceeding a few tens of micrometers.

According to another particular embodiment, first 4 and third 11 layers can respectively form the cathode and anode of electric microbattery 13. Advantageously, the textured front surface 2a of first mould 2 is electrically conducting, and first layer 4 is deposited by hydrothermal electrodeposition means. For example purposes, first mould 2 can be a metal sheet having a base formed by titanium or by a noble metal such as platinum. First mould 2 can also be a substrate, for example a silicon substrate or a polymer substrate of PEN or PET type, covered by a metal layer. The substrate can have a thickness ranging from a few tens of micrometers to a few hundred micrometers. The thickness of the metal layer is much smaller than that of the substrate; it is at least ten times smaller than the thickness of the substrate on which it is deposited.

Electrodeposition by hydrothermal means can be performed in a sealed enclosure under pressure at temperatures comprised between 125 and 250° C. When electrodeposition is performed of lithiated oxide, having a base formed by at least one transition metal "M", of formula $LiM_xO_y$, the enclosure comprises an electrolytic solution preferably comprising a metallic salt formed by the transition metal "M" base and a lithium salt. Advantageously, the metallic salt is of nitrate or acetate type of the transition metal "M", and/or the lithium is a lithium hydroxide salt (LiOH). Said transition metal "M" is advantageously chosen from the group comprising nickel, cobalt, titanium, manganese, and a mixture of these metals. Advantageously, first deposited layer 4 comprises a lithiated oxide containing cobalt, or manganese, or nickel, or titanium. Preferentially the first deposited layer has a base formed by a lithiated cobalt oxide ($LiCoO_2$), or a lithiated nickel oxide ($LiNiO_2$) or a lithiated manganese oxide ($LiMn_2O_4$) or a lithiated titanium oxide ($Li_4Ti_5O_{12}$). The metallic salt of the solution is therefore a cobalt (Co), or nickel (Ni), or manganese (Mn) or titanium (Ti) nitrate or acetate. The metallic salt and lithium salt concentrations can vary from a few thousandths of a mol/L to several mol/L.

When electrodeposition by hydrothermal means is performed, the pressure inside the enclosure is self-generated by evaporation of a part of the electrolytic solution, and it corresponds to the pressure of saturating steam. Preferentially, the enclosure is kept at a temperature configured to maintain a saturating steam pressure inside the enclosure comprised between 4 and 45 bars. The temperature is preferably comprised between 125° C. and 250° C. The substrate on which electrodeposition is envisaged and a counter-electrode are immersed in the electrolytic solution inside the sealed enclosure. The counter-electrode is preferably made from platinum or from another noble metal. Imposing a current or a voltage between the substrate and the counter-electrode then performs electrodeposition. The current density imposed between the substrate and the counter-electrode is generally comprised between 0.1 and 100 $mA/cm^2$. The hydrothermal electrodeposition time depends on the nature of the layer to be deposited and on its thickness, and is typically comprised between a few minutes and a few tens of hours. Electrodeposition by hydrothermal means enables layers having thicknesses comprised between tens of nm and tens of μm to be deposited.

Figure 8A:
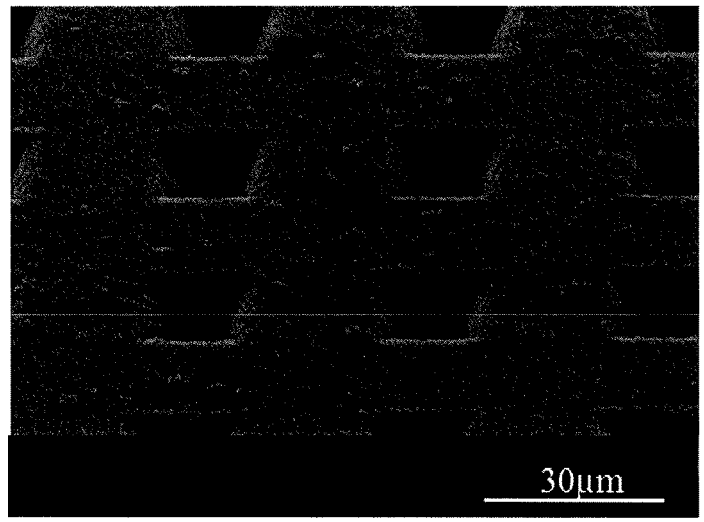
FIGS. 8A and 8B illustrate images made by scanning electron microscopy of a substrate covered by a layer of lithiated cobalt oxide.
Figure 8B:
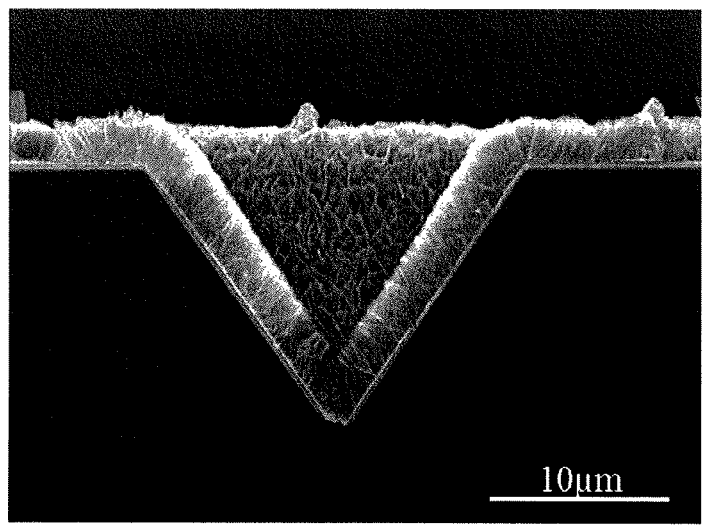

Fabrication of first layer 4, for example from $LiCoO_2$, by electrodeposition by hydrothermal means advantageously enables a thin layer to be formed on the patterned substrates having very good conformities which can be comprised between 80 and 100%. What is meant by conformity, is a ratio that is calculated from the difference of thickness between different areas of the deposited layer. FIGS. 8A and 8B represent images made by scanning electron microscopy (SEM) of a thin layer of $LiCoO_2$ formed by hydrothermal electrodeposition on a silicon-base patterned substrate. Electrodeposition was performed at a temperature of 125° C. for one hour using a current density of 3 $mA \cdot cm^{-2}$ and an electrolytic solution containing LiOH with a concentration of 4 $mol \cdot L^{-1}$ and $Co(NO_3)_2$ with a concentration of 0.5 $mol \cdot L^{-1}$. FIGS. 8A and 8B respectively represent a perspective view and a cross-sectional and side view of the substrate covered by the $LiCoO_2$ layer. The patterned substrate comprises cavities in the form of inverted pyramids. The pyramid has a square base with a size of 20×20 $\mu m^2$ and a height of 15 μm. As can be observed on the SEM images, hydrothermal electrodeposition advantageously enables formation of a layer of $LiCoO_2$ with a thickness of about 2.56 μm, having a very good conformity, of about 97%, between the bottom of the cavities and the surface.

The hydrothermal electrodeposition technique advantageously enables conformal layers to be achieved even on patterned substrates comprising cavities, unlike conventional deposition techniques, such as PVD which induces large shadowing effects. Such effects may prove detrimental for fabrication of a stack comprising several electrochemically active layers designed to form an electrochemical microbattery. In addition, the hydrothermal electrodeposition technique differs with respect to conventional vacuum deposition techniques, in particular ALD, PVD and CVD, in that it can have a high deposition rate, typically a rate comprised between 10 and 300 nm/min. for comparison purposes, the deposition rates of $LiCoO_2$ layers by PVD are very slow, being typically about 10 nm/min.

Advantageously, electrodeposition of first layer 4 by hydrothermal means can be followed by heat treatment at a temperature comprised between 300 and 1100° C. In other words, the first layer is heated to a temperature comprised in this temperature range. The heat treatment can be performed in an inert or reactive atmosphere depending on the required properties and the nature of the deposited material. In particular, the heat treatment makes it possible to obtain, in advantageous manner, particular properties of first layer 4 electrodeposited by hydrothermal means, in particular properties related to the densification and the cristallinity of the deposited layer. The heat treatment can then advantageously improve the quality of the first layer, thereby resulting in an improvement of the characteristic quantities of all-solid-state electric microbatteries, such as capacity and cycling resistance.

The invention claimed is:

1. A method for producing a stack of layers comprising at least one structured 3D pattern, the method comprising:
   providing a first mould provided with a textured front surface comprising a first 3D pattern, the first 3D pattern presenting a section increasing or decreasing monotonously in a direction perpendicular to the textured front surface;
   depositing a first layer of the stack on the textured front surface so as to cover the first 3D pattern by means of a continuous layer, the first layer having a first surface in contact with the textured front surface of the first mould;
   removing the first mould so as to release the first surface of the first layer presenting a second 3D pattern complementary to the first 3D pattern; and
   depositing conformally a second layer of the stack on the first surface of the first layer so as to cover the second 3D pattern by means of a conform continuous layer;
   wherein a third layer is conformally deposited on the second layer, wherein the second layer is an electrolyte layer and wherein the first and third layers are anode or cathode of an electrochemically active stack formed by the first layer, the second layer and the third layer.

2. The method according to claim 1, wherein before the removal of the first mould, at least one first additional metal layer is deposited conformally on the first layer, the first layer separating the first additional metal layer from the first mould.

3. The method according claim 1, wherein the first 3D pattern is formed by a blind hole opening onto the front surface of the first mould, the first 3D pattern being surrounded by a planar ring made in the front surface.

4. The method according to claim 1, wherein before the removal of the first mould, a support substrate is fixed on the first layer so that the first layer is interposed between the first mould and the support substrate,
   wherein in the deposition of the second layer, the first layer and the second layer form a self-supported stack and the support substrate is removed from the first layer after depositing the second layer.

5. The method according to claim 4, wherein the support substrate is an adhesive substrate bonded to the first layer of the stack, the adhesive substrate having a bonding energy with the first layer higher than a bonding energy between the first layer and the first mould so that the first mould is removed from the first layer by applying a strain by means of the support substrate after removal of the first mould.

6. The method according to claim 4, wherein the support substrate is removed after depositing the second layer.

7. The method according to claim 1, wherein the first layer is deposited conformally so that the electrochemically active stack has a shape corresponding to the textured front surface of the first mould with the first 3D pattern.

8. The method according to claim 2,
wherein before the removal of the first mould, a support substrate is fixed on the first additional layer so that the first additional layer is interposed between the first mould and the support substrate,
wherein in the deposition of the second layer, the first additional layer, the first layer and the second layer form a self-supported stack, and
wherein the support substrate is removed from the first additional layer after depositing the second layer.

9. The method according to claim 8, wherein the support substrate is an adhesive substrate bonded to the first additional layer of the stack, the adhesive substrate having a bonding energy with the first additional layer higher than a bonding energy between the first layer and the first mould so that the first mould is removed from the first layer by applying a strain by means of the support substrate removal of the first mould.

10. The method according to claim 8, wherein the support substrate is removed from the first additional layer by means of a chemical etch of an adhesive bonding between the support substrate and the first additional layer.

11. The method according to claim 5, wherein the support substrate is removed from the first layer by means of a chemical etch of an adhesive bonding between the support substrate and the first layer.

12. The method according to claim 1, wherein the electrolyte layer is made of a solid electrolyte material.

13. The method according to claim 1, wherein the second layer is made of silica and the first 3D pattern has a shape chosen among micropyramids and array of lines.

14. The method according to claim 1, wherein the textured front surface comprises a plurality of 3D patterns configured to form microlenses and waveguides.

15. The method according to claim 2, wherein the first layer is deposited conformally.

16. The method according to claim 1, wherein the third layer is deposited conformally.

17. A method for producing a stack of layers comprising at least one structured 3D pattern, the method comprising:
providing a first mould provided with a textured front surface comprising a first 3D pattern, the first 3D pattern presenting a section increasing or decreasing monotonously in a direction perpendicular to the textured front surface;
depositing a first layer of the stack on the textured front surface so as to cover the first 3D pattern by means of a continuous layer, the first layer having a first surface in contact with the textured front surface of the first mould;
removing the first mould so as to release the first surface of the first layer presenting a second 3D pattern complementary to the first 3D pattern; and
depositing conformally a second layer of the stack on the first surface of the first layer so as to cover the second 3D pattern by means of a conform continuous layer;
wherein the textured front surface of the mould is electrically conducting, and wherein the first layer is deposited by electrodeposition by hydrothermal means.

18. The method according to claim 17, wherein the first layer comprises a lithiated oxide of at least one transition metal chosen from the group comprising nickel, cobalt, manganese, titanium and a mixture of these metals.

* * * * *